United States Patent Office 2,992,276
Patented July 11, 1961

2,992,276
PROCESS FOR PREPARING POLYFLUORO ALKYL COMPOUNDS
Viktor Weinmayr, Landenberg Pa., assignor to E. I. du Pont de Nemours and Company, Wilmington, Del., a corporation of Delaware
No Drawing. Filed May 20, 1959, Ser. No. 814,415
7 Claims. (Cl. 260—614)

This invention relates to a novel process for preparing polyfluoro alkyl compounds and particularly for preparing 1H,1H-pentafluoro-1-propanol and its fluoromethyl ether and to fluoromethyl 2,2,3,3,3-pentafluoropropyl ether as a new compound.

The 1H,1H-pentafluoro-1-propanol and similar alcohols are well known compounds which are valuable for many purposes, particularly as intermediates for the preparation of other compounds containing a polyfluoro alkyl group such as esters, including polymerizable esters, derivatives having low surface tension, dyes, insecticides and medicinals. The fluoromethyl pentafluoropropyl ether, also obtained by this process, is a new chemical compound which is useful as an intermediate for the preparation of the 1H,1H-pentafluoro-1-propanol and for the preparation of polyfluoro alkyl substituted arenes.

The methods heretofore used for the preparation of polyfluoroalkanols are complex and hazardous and require high-cost starting materials. For example, polyfluoroalkanols have been made by reducing perfluoroalkanecarboxylic acids with lithium aluminum hydride as disclosed by Husted et al. in J.A.C.S. 74, 5422 (1955), and from perfluoro aliphatic aldehydes by reaction with Grignard reagents as disclosed by McBee et al. in J.A.C.S. 74, 1736 (1955). 1H,1H-polyfluoroalkanols have also been prepared by electrolyzing solutions of alkanecarboxylic acids in hydrogen fluoride, followed by reduction of the intermediate polyfluoroalkanecarboxylic acids to the corresponding polyfluoroalkanols as disclosed by Husted et al. in Patent 2,666,797.

It is an object of this invention to provide a new and improved process for the preparation of 1H,1H-pentafluoro-1-propanol and its fluoromethyl ether. Another object is to provide such a process which can be readily carried out and controlled to produce either compound as the predominant product. A particular object is to provide a process which employs readily available starting materials and produces the desired products in high yield and high purity and which can be practiced on a large scale without undue hazards. Still another object is to provide fluoromethyl 2,2,3,3,3-pentafluoropropyl ether. Other objects are to provide new compositions of matter and to advance the art. Still other objects will appear hereinafter.

The above and other objects may be accomplished in accordance with this invention which comprises reacting about 0.5 mole of tetrafluoroethylene with 1 mole formaldehyde, which may be in polymeric form, and at least 2 moles of hydrogen fluoride at a temperature in the range of from 0° C. to 150° C. and a pressure in the range of from 0 p.s.i.g. to about 2500 p.s.i.g., there being present not more than 1 part of water for each part of hydrogen fluoride, and separating from the reaction mass at least one member of the group consisting of 1H,1H-pentafluoro-1-propanol and fluoromethyl 2,2,3,3,3-pentafluoropropyl ether.

The fluoromethyl 2,2,3,3,3-pentafluoropropyl ether, obtained in substantial proportions under some of the conditions of this process, is a new chemical compound, having the formula $FCH_2OCH_2CF_2CF_3$, which is useful as an intermediate for the preparation of the 1H,1H-pentafluoro-1-propanol by various methods. It is apparently formed as an intermediate in the process, and is converted to the alcohol by extending the time of the reaction. It can also be prepared by reacting 1H,1H-pentafluoro-1-propanol with formaldehyde and hydrogen fluoride at a temperature of from about 20° C. to about 150° C., preferably from about 50° C. to about 75° C. The ether can also be converted to the alcohol by mixing it or the reaction mixture containing it with concentrated sulfuric acid, of from about 60% to 100% concentration, or concentrated phosphoric acid, of from about 85% to 100% concentration, and heating the resulting mixture at a temperature of from about 50° C. to about 150° C. or fractionally distilling the mixture thereof with the acid to drive off the alcohol as it is formed. When the reaction mixture is treated with one of these concentrated acids, the acid usually will be used in the proportion of from about 5% to about 50% by weight of the reaction mixture, preferably from about 20% to about 30% by weight. Much larger amounts of concentrated acid may be used, but without advantage. When the ether, after separation from the reaction mixture, is treated with the concentrated acid, the acid will be employed in a proportion of at least 20% by weight, usually from about 20% to about 50%, and preferably from about 30% to about 40%.

The fluoromethyl 2,2,3,3,3-pentafluoropropyl ether can also be used for introducing one or more polyfluoroalkyl groups into an arene by reacting the ether with the arene in the presence of zinc chloride or a similar catalyst. For example, fluoromethyl 2,2,3,3,3-pentafluoropropyl ether has been reacted with benzene in the presence of zinc chloride to give fluoroalkyl substituted benzenes.

The process of this invention is simple and readily carried out in conventional reaction vessels that may be heated and agitated and which will withstand the pressures encountered in the reaction. The reaction vessel will be constructed of or lined with a material or materials that is resistant to the corrosive action of anhydrous hydrogen fluoride and/or concentrated solutions of hydrofluoric acid. Suitable materials of construction include platinum, silver, nickel, stainless steel and "Hastelloy."

The process may be carried out as a batch process with the intermittent addition of tetrafluoroethylene to a solution of formaldehyde or of a polymer thereof in hydrogen fluoride or with the intermittent addition of a solution of the formaldehyde or of its polymer in hydrogen fluoride to a charge of tetrafluoroethylene, or as a continuous operation. In a continuous operation, for example, a stream of a solution of paraformaldehyde in anhydrous hydrogen fluoride and a stream of tetrafluoroethylene will be continuously introduced simultaneously into a reaction vessel maintained at the required reaction temperature and pressure, and a solution of the reaction products in hydrogen fluoride will be continuously withdrawn for continuous isolation of the products.

In a batch or intermittent process, the manner in which the tetrafluoroethylene is brought into contact with the formaldehyde solution in hydrogen fluoride may be varied widely without significantly changing the over-all results. The reaction may be run under a constant tetrafluoroethylene pressure, the amount of tetrafluoroethylene to be employed may be charged in a single batch to the reaction vessel at the start of the operation, or tetrafluoroethylene may be added intermittently, allowing the pressure to drop after each addition thereof, until no decrease in pressure with a subsequent addition of tetrafluoroethylene indicates that the reaction is complete. The presently preferred process comprises heating a 20% to 25% solution of paraformaldehyde in anhydrous hydrogen fluoride to 50° C. to 75° C. and, at this temperature with constant agitation, maintaining a pressure of 300 p.s.i.g. to 600 p.s.i.g. with tetrafluoroethylene for 2 to 24 hours.

1H,1H-pentafluoro-1-propanol and fluoromethyl 2,2,3,3,3-pentafluoropropyl ether may be isolated from the reaction mass in a number of ways which are illustrated in the examples.

Atmospheric oxygen tends to initiate self-polymerization of the tetrafluoroethylene. To prevent the possibility of such result, the reaction usually will be carried out in the substantial absence of air. Therefore, the equipment should be carefully flushed with an inert gas, such as nitrogen, to remove air as far as is practicable before the introduction of any reactant which is volatile at the temperature of the reaction vessel. For example, when paraformaldehyde is used, it may be charged to the vessel before the vessel is flushed with the inert gas. The reaction vessel can be charged with any or all of the reactants at a temperature at which they are substantially nonvolatile, prior to flushing it with inert gas. Otherwise, the vessel should be flushed with the inert gas before charging the reactants. The air or atmospheric oxygen, which is normally present in dissolved form in the reactants, does not appear to be harmful.

The amount of the intermediate fluoromethyl 2,2,3,3,3-pentafluoropropyl ether, which is obtained in the reaction mixture, will depend upon the reaction conditions. In general, short reaction times and low reaction temperatures are conducive to the production of large proportions of the ether in the reaction products. If the temperature employed is at or below about 50° C. and the reaction is stopped after a short period of time, the ether tends to be formed as the major product. At the higher temperatures and longer reaction times, the alcohol is the major product and if the reaction times are sufficiently prolonged, the alcohol will constitute substantially the sole product. However, when it is desired to obtain the alcohol as substantially the sole product, it will usually be preferred to carry out the reaction in the presence of from about 5% to about 50% by weight of concentrated sulfuric acid.

It has been found so far that only tetrafluoroethylene and hexafluoropropylene will react with formaldehyde and hydrogen fluoride to form polyfluoroalkanols. When other polyfluoroolefins, such as hexafluorocyclobutene, perfluoroisobutylene, the dimer of hexafluoropropylene, the trimer of hexafluoropropylene, and 9H-polyfluoro-1-nonene, were employed in the place of tetrafluoroethylene in the process of this invention, the expected polyfluoroalkanols could not be identified in the reaction mass. Hexafluoropropylene requires different critical conditions and the process as applied thereto is disclosed and claimed in my copending application, Serial No. 814,386, filed May 20, 1959.

The tetrafluoroethylene employed in this process may or may not contain a polymerization inhibitor. Usually, it is preferred to employ the commercially available tetrafluoroethylene which contains a polymerization inhibitor so as to ensure against any possible polymerization of the tetrafluoroethylene. The presence of the polymerization inhibitor does not affect the reactivity of the tetrafluoroethylene in this process or affect the yield or quality of the desired products.

The formaldehyde may be used in its unpolymerized form or in the form of one of its polymers, such as trioxane and paraformaldehyde, without affecting the rate or the course of the reaction. For ease of handling and for economic reasons, the formaldehyde ordinarily will be in the form of paraformaldehyde. Other aldehydes, such as acetaldehyde, paraldehyde (a polymeric form of acetaldehyde), and benzaldehyde were found to be inoperable in the process of this invention.

Preferably, the hydrogen fluoride will be anhydrous hydrogen fluoride. This is for practical reasons, such as keeping the corrosion of the equipment at a minimum. It is unnecessary to employ special precautions to maintain anhydrous conditions for the reaction to proceed satisfactorily. Aqueous hydrofluoric acid of 50% concentration or higher may be used. More dilute hydrofluoric acid tends to cause excessive corrosion of the equipment and excessive decrease in the yield of the desired products. The anyhdrous hydrogen fluoride need not be completely pure, but commercial anhydrous hydrogen fluoride, which contains traces of sulfur compounds, is quite satisfactory.

Catalysts are not required for the reaction of the process of this invention, but the reaction takes place at satisfactory rates in the absence of any catalytic material. Such substances as sodium fluoride, mercuric oxide, boric acid anhydride, arsenic trioxide and phosphorous pentoxide were tested as possible catalysts but were found to have no influence on the course of the reaction or on the reaction rate.

The amount of tetrafluoroethylene required for the reaction is 0.5 mole per mole of formaldehyde. Less than this amount of tetrafluoroethylene results in a corresponding decrease in the production of the desired products from a given amount of formaldehyde, and more than this amount comprises an excess of tetrafluoroethylene which must be recovered or will be wasted.

Although the stoichiometric equation for the reaction of this process requires only 1 mole of hydrogen fluoride for each mole of formaldehyde, it has been found that at least 2 moles of hydrogen fluoride for each mole of formaldehyde must be used. Materially smaller proportions of hydrogen fluoride fail to produce the desired reaction and products. Usually, there will be employed from about 3 to about 7 moles of hydrogen fluoride for each mole of formaldehyde, preferably 4 to 5 moles of hydrogen fluoride. Much larger excesses of hydrogen fluoride may be used, but such excesses provide no advantage and merely increase the problem of recovering the excess hydrogen fluoride.

When it is desired to obtain the 1H,1H-pentafluoro-1-propanol as substantially the sole product, it will usually be preferred to carry out the reaction in the presence of concentrated sulfuric acid (of from about 96% to 100% concentration) employing at least about 5% by weight of the concentrated acid based on the total weight of the other reactants. Usually, the concentrated sulfuric acid will be present in the proportion of from about 20% to about 50% by weight and preferably from about 20% to about 30% by weight. Such concentrated sulfuric acid aids in the conversion of the fluoromethyl 2,2,3,3,3-pentafluoropropyl ether to the 1H,1H-pentafluoro-1-propanol. The concentrated sulfuric acid has the further advantage that, when the reaction mass is fractionally distilled, the excess hydrogen fluoride and essentially anhydrous 1H,1H-pentafluoro-1-propanol substantially free from hydrogen fluoride are readily obtained as separate fractions. In the absence of the concentrated sulfuric acid, an azeotrope distills which consists of about 1.5 parts of 1H,1H-pentafluoro-1-propanol and about 1 part of hydrogen fluoride.

The concentrated sulfuric acid may be added to the reaction mass, after the tetrafluoroethylene/formaldehyde/hydrogen fluoride reaction has taken place, with the same effect on the conversion of the ether to the alcohol and produces a clean separation of the hydrogen fluoride from the alcohol during the distillation, yielding the alcohol substantially free of hydrocarbon fluoride. In this case, the sulfuric acid should be in a proportion of at least 20% by weight of the reaction mixture treated, usually from about 20% to about 50% and preferably from about 30% to about 40%.

The reaction may be carried out at a temperature in the range of from 0° C. to 150° C. For a smooth, controlled reaction with high conversion and yield, the temperatures usually will be in the range of from about 20° C. to about 100° C., preferably from about 50° C. to about 75° C. As the temperatures are increased above 100° C. there is an increased tendency for the formation of undesirable by-products which cause a corresponding reduction in the yield of the desired products.

The pressure usually will depend partly upon the amount of tetrafluoroethylene charged to the reaction vessel and present at any given stage of the reaction and partly upon the temperature at which the reaction is run. The pressure may range from about atmospheric pressure, 0 p.s.i.g. (pounds per square inch gauge), to about 2500 p.s.i.g. Usually, the pressure will be the autogenous pressure at the temperature employed, i.e. from about 25 p.s.i.g. to about 2000 p.s.i.g. At temperatures in the range of from about 20° C. to about 100° C., the preferred pressure is from about 200 p.s.i.g. to about 600 p.s.i.g. The pressures can be independently increased further by compression or by introduction of the tetrafluoroethylene or of an inert gas such as nitrogen under the desired pressure. It is unnecessary and usually undesirable to employ pressures of tetrafluoroethylene materially in excess of 700 p.s.i.g. With little or no excess of tetrafluoroethylene over the stoichiometric amount, the pressure decreases during the reaction as the tetrafluoroethylene is consumed.

In order to more clearly illustrate this invention, presently preferred modes of carrying it into effect, and advantageous results obtained, the following examples are given in which the proportions are by weight except where specifically indicated otherwise.

EXAMPLE 1

A 1500 cc. stainless steel, electrically heated, pressure reaction vessel, fitted with a mechanical agitator, was charged with 180 parts of paraformaldehyde, the air within the vessel was displaced with nitrogen, and then 600 parts of anhydrous hydrogen fluoride were added. The reactor was then closed, heated to 50° C., and connected to a cylinder of tetrafluoroethylene. A tetrafluoroethylene pressure of 300 p.s.i.g. was established within the reactor and maintained for 24 hours while the reactor was kept under agitation and at a temperature of 50° C. The tetrafluoroethylene line was then closed, the reactor and its charge cooled to about 10° C., the excess tetrafluoroethylene vented to the atmosphere, and the reactor swept with nitrogen. The contents of the reactor were discharged onto about 4000 parts of crushed ice. The cold dilution mass was made slightly alkaline to litmus with ammonia gas while keeping the temperature below 30° C. The mixture was then distilled until no more water-insoluble material separated from the distillate. The distillate comprised two liquid layers, an upper layer of water and 583 parts of a lower layer. The lower layer of material was separated by fractionation into 61 parts of a distillate collected between 40° C. and 78° C. and 429 parts of material distilling at 78° C. to 80° C. The lower boiling distillate was redistilled and found to consist mainly of a material having a boiling point of 60° C. which was identified by its infrared spectrum, nuclear magnetic resonance, and chemical analysis as fluoromethyl 2,2,3,3,3-pentafluoropropyl ether. The distillate collected at 78° C. to 80° C. was analyzed in the same way and found to be a mixture of 94.5% 1H,1H-pentafluoro-1-propanol and 5.5% water.

EXAMPLE 2

The reactor described in Example 1 was charged with 180 parts of paraformaldehyde, flushed with nitrogen, and then 600 parts of anhydrous hydrogen fluoride were added. Then 250 parts of tetrafluoroethylene was weighed into a small cylinder, and the cylinder was connected and opened to the reactor previously heated to 50° C. and held at this temperature. During about three hours, the initial tetrafluoroethylene pressure of 300 p.s.i.g. decreased to about 60 p.s.i.g. After three additional hours, no further change in the pressure occurred. The procedure, described in Example 1 for isolating the reaction products, was followed. The unrefined mixture of 1H,1H-pentafluoro-1-propanol and fluoromethyl 2,2,3,3,3-pentafluoropropyl ether amounted to 306 parts and was separated into 125 parts of the unrefined alcohol and 181 parts of the unrefined ether.

This procedure was repeated with the temperature of the reactor maintained at 75° C. for the reaction. The pressure of the tetrafluoroethylene dropped from an initial value of 300 p.s.i.g. to 70 p.s.i.g. during 90 minutes and remained unchanged. The unrefined polyfluoropropanol/polyfluoropropyl ether mixture amounted to 260 parts which was separated into 156 parts of the unrefined alcohol and 104 parts of the unrefined ether.

EXAMPLE 3

*Ninety percent hydrofluoric acid solution as a reactant*

The reactor described in Example 1 was charged with 105 parts of paraformaldehyde, flushed with nitrogen, and 550 parts of 90% aqueous hydrofluoric acid solution were added. The reactor was heated to 50° C., and connected to a cylinder of tetrafluoroethylene. Tetrafluoroethylene was admitted to the reactor, and the reaction mass was kept under a tetrafluoroethylene pressure of 400 p.s.i.g. for 42 hours with agitation and at a temperature of 50° C. At the end of this time, the procedure described in Example 1 for separating the semi-refined mixture of 1H,1H-pentafluoro-1-propanol and fluoromethyl 2,2,3,3,3-pentafluoropropyl ether was followed. The product amounted to 250 parts which was separated into 222 parts of the unrefined alcohol and 28 parts of the unrefined ether.

EXAMPLE 4

*Eighty percent hydrofluoric acid solution as a reactant*

The reactor described in Example 1 was charged with 105 parts of formaldehyde, flushed with nitrogen, 600 parts of 80% aqueous hydrofluoric acid solution were added, and the reactor heated to 75° C. and connected to a cylinder of tetrafluoroethylene. Tetrafluoroethylene was admitted to the reactor, and the reaction mass was kept under a tetrafluoroethylene pressure of 300 p.s.i.g. to 400 p.s.i.g. for 40 hours with agitation and at a temperature of 75° C. The semi-refined water-insoluble product obtained from the reaction mass contained little or no material boiling below 78° C. Practically all of the material distilled between 78° C. and 80° C. and was, therefore, essentially 1H,1H-pentafluoro-1-propanol free from fluoromethyl 2,2,3,3,3-pentafluoropropyl ether.

EXAMPLE V

*Reaction in presence of sulfuric acid*

Into a 500 cc. stainless steel reaction vessel cooled to −60° C. was charged 45 parts of paraformaldehyde, flushed with nitrogen, and then 180 parts of anhydrous hydrogen fluoride, 90 parts of 100% sulfuric acid, and 150 parts of tetrafluoroethylene were added. The reactor was closed, heated to 50° C., and maintained at this temperature for 6 hours with agitation. The procedure, described in Example 1 for isolating the reaction products, was followed to yield 120 parts of 1H,1H-pentafluoro-1-propanol and only a trace of fluoromethyl 2,2,3,3,3-pentafluoropropyl ether.

EXAMPLE 6

*Trioxane as a reactant*

The reactor described in Example 1 was charged with 105 parts of trioxane, flushed with nitrogen, and 500 parts of anhydrous hydrogen fluoride were added. Then 360 parts of tetrafluoroethylene was weighed into a small cylinder, and the cylinder was connected and opened to the reactor previously heated to 50° C. During about four hours, the pressure decreased from 200 p.s.i.g. to a constant value of 100 p.s.i.g. The reaction mass was allowed to stand for several days and then the procedure, described in Example 1, was followed to isolate an unrefined mixture of 1H,1H-pentafluoro-1-propanol and fluoromethyl 2,2,3,3,3-pentafluoropropyl ether amounting to 290 parts. This mixture was separated into 275 parts of the unrefined alcohol and 15 parts of the unrefined ether. Apparently, most of the ether was converted to the alcohol during the standing period.

EXAMPLE 7

Trioxane in a solvent as a reactant

The reactor described in Example 1 was flushed with nitrogen, charged with 500 parts of anhydrous hydrogen fluoride, closed, and heated to 50° C. A cylinder of tetrafluoroethylene was then connected to the reactor so that a pressure of tetrafluoroethylene of 340 p.s.i.g. could be imposed upon and maintained in the reactor. Against this pressure, a solution of 105 parts of trioxane in 165 parts of 1,1,2,2,-tetrachloroethane was continuously pumped into the reactor under agitation over a 4 hour period. The temperature was held at 50° C. and the agitation continued for two hours longer. By following the procedure for treating and distilling the reaction mass given in Example 1, 83 parts of unrefined fluoromethyl 2,2,3,3,3-pentafluoropropyl ether collected in the distillation range of 50° C. to 78° C. and 114 parts of 94.5% 1H,1H-pentafluoro-1-propanol distilling at 78° C. were obtained.

EXAMPLE 8

Intermittent addition of tetrafluoroethylene

The reactor described in Example 1 was charged with 180 parts of paraformaldehyde, flushed with nitrogen, charged with 360 parts of anhydrous hydrogen fluoride, closed, and heated to 50° C. A small cylinder, containing 650 parts of tetrafluoroethylene, was connected to the reactor, opened to place the reactor under a pressure of 300 p.s.i.g., and then closed. Within an hour, the pressure dropped to 50 p.s.i.g. Again the cylinder was opened to restore the pressure to 300 p.s.i.g. and then closed to allow the reaction to take place with a drop in the pressure. This procedure was repeated until the pressure of an increment of tetrafluoroethylene decreased only a few pounds and remained constant, indicating that the reaction had gone as far as it would. The unrefined mixture of 1H,1H-pentafluoro-1-propanol and fluoromethyl 2,2,3,3,3-pentafluoropropyl ether, isolated as described in Example 1, amounted to 333 parts. This mixture was separated into 144 parts of the unrefined alcohol and 189 parts of the unrefined ether.

In this example, three moles of hydrogen fluoride were used for each mole of formaldehyde in the form of paraformaldehyde and gave a satisfactory reaction with the intermittent addition of the tetrafluoroethylene. When the procedure was repeated except that 180 parts of hydrogen fluoride were used to provide 1.5 moles of hydrogen fluoride per mole of formaldehyde, none of the desired reaction products could be isolated.

EXAMPLE 9

Reaction at 100° C.

The reactor described in Example 1 was charged with 105 parts of paraformaldehyde, flushed with nitrogen, then charged with 500 parts of anhydrous hydrogen fluoride, heated to 100° C., and connected to a source of tetrafluoroethylene. Rapid absorption of tetrafluoroethylene at a pressure of 280 p.s.i.g. occurred for about 90 minutes with the temperature maintained at 100° C. By following the procedure for treating and distilling the reaction mass given in Example 1, 25 parts of unrefined fluoromethyl 2,2,3,3,3-pentafluoropropyl ether and 131 parts of 1H,1H-pentafluoro-1-propanol were obtained.

EXAMPLE 10

Reaction at 20° C.

The reactor described in Example 1 was charged with 105 parts of formaldehyde, flushed with nitrogen, charged with 500 parts of anhydrous hydrogen fluoride, and connected with a small cylinder containing 362 parts of tetrafluoroethylene. The temperature was adjusted to 20° C. The cylinder of tetrafluoroethylene was opened to the reactor, and the charge was agitated for 52 hours while maintaining the temperature at 20° C. The gauge pressure of the tetrafluoroethylene dropped from 250 lbs. to 60 lbs. during this time. By following the procedure for treating and distilling the reaction mass given in Example 1, 18 parts of unrefined fluoromethyl 2,2,3,3,3-pentafluoropropyl ether and 283 parts of 1H,1H-pentafluoro-1-propanol were obtained.

EXAMPLE 11

Reaction for 2 hours at 50° C.

The reactor described in Example 1 was charged with 180 parts of paraformaldehyde, flushed with nitrogen, charged with 600 parts of anhydrous hydrogen fluoride, heated to 50° C., and connected to a source of tetrafluoroethylene. A tetrafluoroethylene pressure of 280 p.s.i.g. was imposed upon the charge in the reactor and maintained for two hours with agitation and maintenance of the temperature at 50° C. At the end of this time, the tetrafluoroethylene supply was shut off, and the reactor was rapidly cooled. By following the procedure for treating and distilling the reaction mass given in Example 1, 163 parts of unrefined fluoromethyl 2,2,3,3,3-pentafluoropropyl ether and 142 parts of 1H,1H-pentafluoro-1-propanol were obtained.

EXAMPLE 12

Addition of sulfuric acid after the reaction

The reactor described in Example 1 was charged with 180 parts of paraformaldehyde, flushed with nitrogen, and 600 parts of anhydrous hydrogen fluoride were added. The reactor was heated to 50° C., and connected to a source of tetrafluoroethylene. A tetrafluoroethylene pressure of 230 p.s.i.g. to 300 p.s.i.g. was imposed upon the charge in the reactor and maintained for 24 hours with agitation and maintenance of the temperature at 50° C. The reactor and reaction mass were then cooled to 10° C., the excess tetrafluoroethylene was vented to the air, and the reactor was swept with nitrogen. To the reactor, 300 parts of 96% sulfuric acid were added, and the mixture was heated to 60° C. and held at this temperature for 6 hours. The reaction mass was cooled and fractionally distilled. The first distillate comprised hydrogen fluoride, amounting to 520 parts, which could be used as distilled for subsequent reaction with formaldehyde and tetrafluoroethylene. The material, distilling at 78° C. to 80° C., was essentially anhydrous 1H,1H-pentafluoro-1-propanol and amounted to 370 parts. This polyfluoroalkanol contained a trace of hydrogen fluoride which was neutralized with ammonia gas. After filtration and fractionation, 330 parts of anhydrous 1H,1H-pentafluoro-1-propanol was obtained.

When the procedure of this example was repeated without adding the sulfuric acid, the distillate obtained from material distilling at 80° C. consisted of a mixture of one part of hydrogen fluoride and one and a half parts of 1H,1H-pentafluoro-1-propanol.

The proportions of reagents and the conditions employed in the preceding Examples 1 to 12 are summarized in the following Table I in which TFE means tetrafluoroethylene:

TABLE I

| Ex. No. | CH₂O, parts by wt. | HF, parts by wt. | Mole Ratio, HF/CH₂O | Temp. for reaction, °C. | Time, hrs. | TFE, parts by wt. or press. | Comments |
|---|---|---|---|---|---|---|---|
| 1 | 180 | 600 | 5.0 | 50 | 24 | 300 p.s.i.g | |
| 2 | {180 | 600 | 5.0 | 50 | 3 | 250 parts | |
|   | {180 | 600 | 5.0 | 75 | 1.5 | do | |
| 3 | 105 | 550 (90%) | 7.1 | 50 | 42 | 400 p.s.i.g | |
| 4 | 105 | 600 (80%) | 6.9 | 75 | 40 | 300–400 p.s.i.g | No ether in products. |
| 5 | 45 | 100 | 3.3 | 50 | 6 | 150 parts | H₂SO₄ added before reaction. |
| 6 | 105, as trioxane | 500 | 7.1 | 50 | 10 | 360 parts | |
| 7 | do | 500 | 7.1 | 50 | 6 | 340 p.s.i.g | Trioxane in C₂H₂Cl₄. |
| 8 | 180 | 360 | 3.0 | 50 | | 650 parts | Intermittent addn. of TFE. |
| 8 | 180 | 180 | 1.5 | 50 | | do | Desired product missing. |
| 9 | 105 | 500 | 7.1 | 100 | 1.5 | 280 p.s.i.g | |
| 10 | 105 | 500 | 7.1 | 20 | 52 | 362 parts | |
| 11 | 180 | 600 | 5.0 | 50 | 2 | 280 p.s.i.g | High yield of ether. |
| 12 | 180 | 600 | 5.0 | 50 | 24 | 230–300 p.s.i.g | H₂SO₄ added after reaction. |

EXAMPLE 13

*Preparation of fluoromethyl 2,2,3,3,3-pentafluoropropyl ether from 1H,1H-pentafluoro-1-propanol*

In a 500 cc. stainless steel pressure reactor, 150 parts of anhydrous 1H,1H-pentafluoro-1-propanol, 60 parts of paraformaldehyde, and 200 parts of anhydrous hydrogen fluoride were heated together at 55° C. for 6 hours. At the end of this time, the reactor contents were cooled to 0° C., poured onto about 1500 parts of crushed ice, and made alkaline to litmus with ammonia. On distillation, 165 parts of a water-insoluble material was collected. From this product was obtained by fractionation 50 parts of a material distilling at 60° C. which was identified by infrared analysis and nuclear magnetic resonance as fluoromethyl 2,2,3,3,3-pentafluoropropyl ether.

EXAMPLE 14

*Conversion of fluoromethyl 2,2,3,3,3-pentafluoropropyl ether to 1H,1H-pentafluoro-1-propanol*

In a glass flask equipped with a water-cooled reflux condenser, a mixture of 54 parts of fluoromethyl 2,2,3,3,3-pentafluoropropyl ether and 25 parts of 96% sulfuric acid was agitated, heated to 60° C. to 65° C., and maintained at this temperature for 8 hours. Hydrogen fluoride that evolved was allowed to escape through the condenser. At the end of the heating period, the reflux condenser was replaced by a fractionating column and the contents of the flask distilled. A distillate, boiling at 80° C. and amounting to 40 parts, was identified as 1H,1H-pentafluoro-1-propanol.

EXAMPLE 15

*Dehydration of 1H,1H-pentafluoro-1-propanol*

In a glass reaction vessel, 1031 parts of 1H,1H-pentafluoro-1-propanol, containing about 6% of water, and 350 parts of 100% sulfuric acid were agitated at about 30° C. for about 2 hours. Upon fractional distillation from the sulfuric acid solution, 975 parts of 1H,1H-pentafluoro-1-propanol, containing less than 0.26% of water, was obtained. Vapor phase chromatography showed the distillate was free of by-products.

It will be understood that the preceding examples have been given for illustrative purposes solely and that this invention is not limited to the specific embodiments disclosed therein. On the other hand, it will be readily apparent to those skilled in the art that, subject to the limitations set forth in the general description, the materials, proportions of materials, conditions and techniques employed may be widely varied without departing from the spirit or scope of this invention.

From the foregoing description, it will be apparent that this invention provides a new and improved process for making 1H,1H-pentafluoro-1-propanol and its fluoromethyl ether, which process uses readily available starting materials and produces the desired products in high yields and high purity. It is simple and easy to operate and control and can be practiced on a large scale without undue hazards. Also this invention provides a valuable, new and useful ether, the fluoromethyl 2,2,3,3,3-pentafluoropropyl ether. Therefore, it will be apparent that this invention constitutes a valuable advance in and contribution to the art.

The embodiments of the invention in which an exclusive property or privilege is claimed are defined as follows.

1. The process which comprises reacting about 0.5 mole of tetrafluoroethylene with 1 mole formaldehyde and at least 2 moles of hydrogen fluoride at a temperature in the range of from 0° C. to 150° C. and a pressure in the range of from 0 p.s.i.g. to about 2500 p.s.i.g., there being present not more than 1 part of water for each part of hydrogen fluoride, and separating from the reaction mass at least one member of the group consisting of 1H,1H-pentafluoro-1-propanol and fluoromethyl 2,2,3,3,3-pentafluoropropyl ether.

2. The process which comprises reacting about 0.5 mole of tetrafluoroethylene with 1 mole formaldehyde and from about 3 to about 7 moles of anhydrous hydrogen fluoride at a temperature in the range of from 0° C. to 150° C. and a pressure in the range of from 0 p.s.i.g. to about 2500 p.s.i.g. and separating from the reaction mass at least one member of the group consisting of 1H,1H-pentafluoro-1-propanol and fluoromethyl 2,2,3,3,3-pentafluoropropyl ether.

3. The process which comprises reacting in the substantial absence of air about 0.5 mole of tetrafluoroethylene with 1 mole formaldehyde and from about 4 to about 5 moles of anhydrous hydrogen fluoride at a temperature in the range of from about 50° C. to about 75° C. and a pressure in the range of from about 200 p.s.i.g. to about 600 p.s.i.g. and separating from the reaction mass at least one member of the group consisting of 1H,1H-pentafluoro-1-propanol and fluoromethyl 2,2,3,3,3-pentafluoropropyl ether.

4. The process which comprises reacting and in the presence of sulfuric acid of from about 96% to 100% concentration about 0.5 mole of tetrafluoroethylene with 1 mole formaldehyde and at least 2 moles of anhydrous hydrogen fluoride at a temperature in the range of from 0° C. to 150° C. and a pressure in the range of from 0 p.s.i.g. to about 2500 p.s.i.g., the concentrated sulfuric acid being present in a proportion of from about 5% to about 50% by weight of the other reactants, and separating from the reaction mass 1H,1H-pentafluoro-1-propanol.

5. The process which comprises reacting in the substantial absence of air and in the presence of sulfuric acid of from about 96% to 100% concentration about 0.5 mole of tetrafluoroethylene with 1 mole formaldehyde and from about 3 to about 7 moles of anhydrous hydrogen fluoride at a temperature in the range of from about 20° C. to about 100° C. and a pressure in the range of from about 25 p.s.i.g. to about 700 p.s.i.g, the concentrated sulfuric acid being present in a proportion of from about 20% to about 30% by weight of the other reactants, and separating from the reaction mass 1H,1H-pentafluoro-1-propanol.

6. The process which comprises reacting in the substantial absence of air about 0.5 mole of tetrafluoroethylene with 1 mole formaldehyde and at least 2 moles of anhydrous hydrogen fluoride at a temperature in the range of from 0° C. to 150° C. and a pressure in the range of from 0 p.s.i.g. to about 2500 p.s.i.g., adding to the reaction mixture at least 20% by weight of sulfuric acid of from about 96% to 100% concentration, and fractionally distilling the mixture to separate the reaction products and recover substantially pure anhydrous 1H,1H-pentafluoro-1-propanol.

7. Fluoromethyl 2,2,3,3,3-pentafluoropropyl ether.

References Cited in the file of this patent

FOREIGN PATENTS

| | | |
|---|---|---|
| 583,874 | Great Britain | Jan. 1, 1947 |
| 604,580 | Great Britain | July 6, 1948 |

OTHER REFERENCES

Thomas: Anhydrous Aluminum Chloride in Organic Chemistry (1941), page 878.